United States Patent [19]

Brooks et al.

[11] 4,347,474
[45] Aug. 31, 1982

[54] SOLID STATE REGULATED POWER TRANSFORMER WITH WAVEFORM CONDITIONING CAPABILITY

[75] Inventors: James L. Brooks, Oxnard; Roger I. Staab, Camarillo, both of Calif.; James C. Bowers; Harry A. Nienhaus, both of Tampa, Fla.

[73] Assignee: The United States of America as represented by the Secretary of the Navy, Washington, D.C.

[21] Appl. No.: 188,419

[22] Filed: Sep. 18, 1980

[51] Int. Cl.[3] .............................................. G05F 1/445
[52] U.S. Cl. .................................... 323/224; 323/222; 323/282
[58] Field of Search .............................. 323/222–224, 323/282–290, 351; 363/63

[56] References Cited

U.S. PATENT DOCUMENTS

| 3,564,394 | 2/1971 | Opal et al. | 323/224 |
| 4,168,477 | 9/1979 | Burchall | 323/222 |

FOREIGN PATENT DOCUMENTS

| 1045002 | 10/1966 | United Kingdom | 363/124 |
| 472339 | 9/1975 | U.S.S.R. | 323/224 |
| 488197 | 2/1976 | U.S.S.R. | 323/282 |

OTHER PUBLICATIONS

Bowers et al, "A Solid State Transformer", PESC '80 Record, IEEE Power Electronics Specialists Conf., Atlanta, Ga., USA, (16-20 Jun. 1980), pp. 253–264.
Nienhaus & Bowers, "An Active Power Band Pass Filter", PESC '78 Record, pp. 307–316, Jun. 15, 1978.
Middlebrook et al, "A General Unified Approach to Modelling Switching-Converter Power Stages", PESC '76 Record, pp. 18–31.

Primary Examiner—William H. Beha, Jr.
Attorney, Agent, or Firm—Robert F. Beers; Joseph M. St. Amand; W. C. Daubenspeck

[57] ABSTRACT

Apparatus for providing the voltage transformation functions of a conventional electrical power transformer. An AC input signal is chopped in a solid state switching converter at a frequency very much larger than the frequency of the input signal and then filtered to attenuate the high frequency component while passing the frequency of the AC input signal. The switching converter includes a pair of bidirectional solid state switches, an inductor and a capacitor connected in a buck converter, boost converter or buck-boost converter arrangement to provide a step up, step down, or step up/step down capability, respectively. A feedback signal modulates the duty cycle of the switching converter to provide automatic voltage regulation under varying loads and leading and lagging power factors.

9 Claims, 7 Drawing Figures

SOLID STATE REGULATED POWER TRANSFORMER WITH WAVEFORM CONDITIONING CAPABILITY

BACKGROUND OF THE INVENTION

This invention relates generally to electrical power transformation and more particularly, to a solid state circuit for performing the functions of a conventional iron core transformer.

Electrical power transformers are used primarily as voltage transformation devices. That is, the voltage input is either transformed up to a higher level, or down to a lower level. In the distribution of electrical energy, it is customary to transform the voltage up to a high level at the generating source, distribute the energy via transmission lines at the high level, then transform the voltage back down to a lower level for use by the load. This is the most efficient means of distribution over long distances. Over short distances, the transformer is used merely to adapt loads designed for different voltages to the local distribution system.

The power transformers consist of insulated copper wire wound on an iron core and in their simplest form consist of two windings usually referred to as the primary winding and the secondary winding. The turns ratio of these two windings establishes the voltage step up or step down capabilities of the device. At the very low power levels a single winding is sometimes used in a configuration referred to as an auto-transformer. In these devices, the input/output voltage ratio is varied by a sliding contactor, making electro-mechanical contact with noninsulated portions of the single winding.

The electrical power transformer has been the backbone of the electric utility distribution system for many years. The power transformer has a very high efficiency (98 percent) and a very good history of reliability. However, in these days of energy consciousness and environmental restrictions, all aspects of electrical hardware engineering from power generation, through distribution to the end use, are being subjected to question, even the trusted transformer.

There are applications of electrical power, especially in the military, where even the smallest of wave form defects/abnormalities cannot be tolerated, such as communication stations or data processing facilities. In addition, the Navy specifically has a problem in providing power to its piers because of the heavy loads represented by ships of all classes. Not only are these loads heavy but they are variable and intermittent, which poses a severe voltage regulation problem.

Any large user of electrical power such as the Navy will view even one-half percent increase in efficiency worthwhile because of the rising cost of electrical power. While 98 percent efficiency sounds extremely good, the two percent loss is a steady, constant loss, 24 hours of every day, which is primarily associated with the core losses of the transformer. This loss occurs whether the transformer is loaded or not. Therefore a better measure of cost effectiveness is not the classical efficiency of the transformer but one which includes a "use" factor which may be spread over the life of the installation.

Yet another problem is that the Navy has thousands of "askarel liquid" filled transformers, many of which are quite old. Askarel is formulated from polychlorinated biphenyl (PCB) and is now classified as a highly toxic, non-biodegradable pollutant under Title 40 Code of Federal Regulations. As of 1 Oct. 1977, the Environmental Protection Agency will no longer allow the sale of askarel filled transformers. Those transformers in the "field" must have the askarel removed and replaced by a substitute coolant in the near future. Unfortunately, the substitute liquids are more expensive and do not carry the same fireproof rating as askerel, which will result in yet higher costs for compensating external fire protection provisions in the installations. Even "dry-pack" type transformers are not the answer since they too are not considered fireproof by the National Fire Protection Agency and therefore cannot be used in certain locations. Indeed, an alternative to the conventional electrical power transformer as we know it today is desirable.

SUMMARY OF THE INVENTION

It is an object of the present invention to provide a power transformer which overcomes the environmental problems associated with conventional power transformers.

Another object of the present invention is to provide solid state (semiconductor) apparatus which provides many of the functional characteristics of the conventional power transformer while having the advantages of solid state circuitry.

Another object of the present invention is to provide solid state apparatus which provides variable step up or step down voltage transformation.

A further object of the present invention is to provide a solid state transformer having automatic voltage regulation with varying loads and leading and lagging power factors.

Still another object of the present invention is to provide a solid state transformer having high efficiency high reliability, and superior voltage regulation, independent of load diversity.

These and other objects are provided by a solid state transformer in which the AC input signal to be transformed is chopped in a solid state switching converter at a frequency very much larger than the frequency of the AC input signal and then filtered to attenuate the high frequency component while passing the frequency of the AC input signal. The switching converter includes a pair of bidirectional solid state switches, an inductor and a capacitor which are connected in a buck converter, a boost converter, or a buck-boost converter arrangement to provide a step up capability, a step down capability, or a step up/step down capability, respectively. The duty cycle of the converter which determines the gain of the transformer is controlled by a feedback signal derived from the transformer output and a reference signal from an automatic gain control circuit.

Other advantages and novel features of the invention will become apparent from the following detailed description of the invention when considered in conjunction with the accompanying drawing wherein like reference characters represent like or similar parts in the several embodiments and wherein:

DESCRIPTION OF THE PREFERRED EMBODIMENTS

Figure 1:
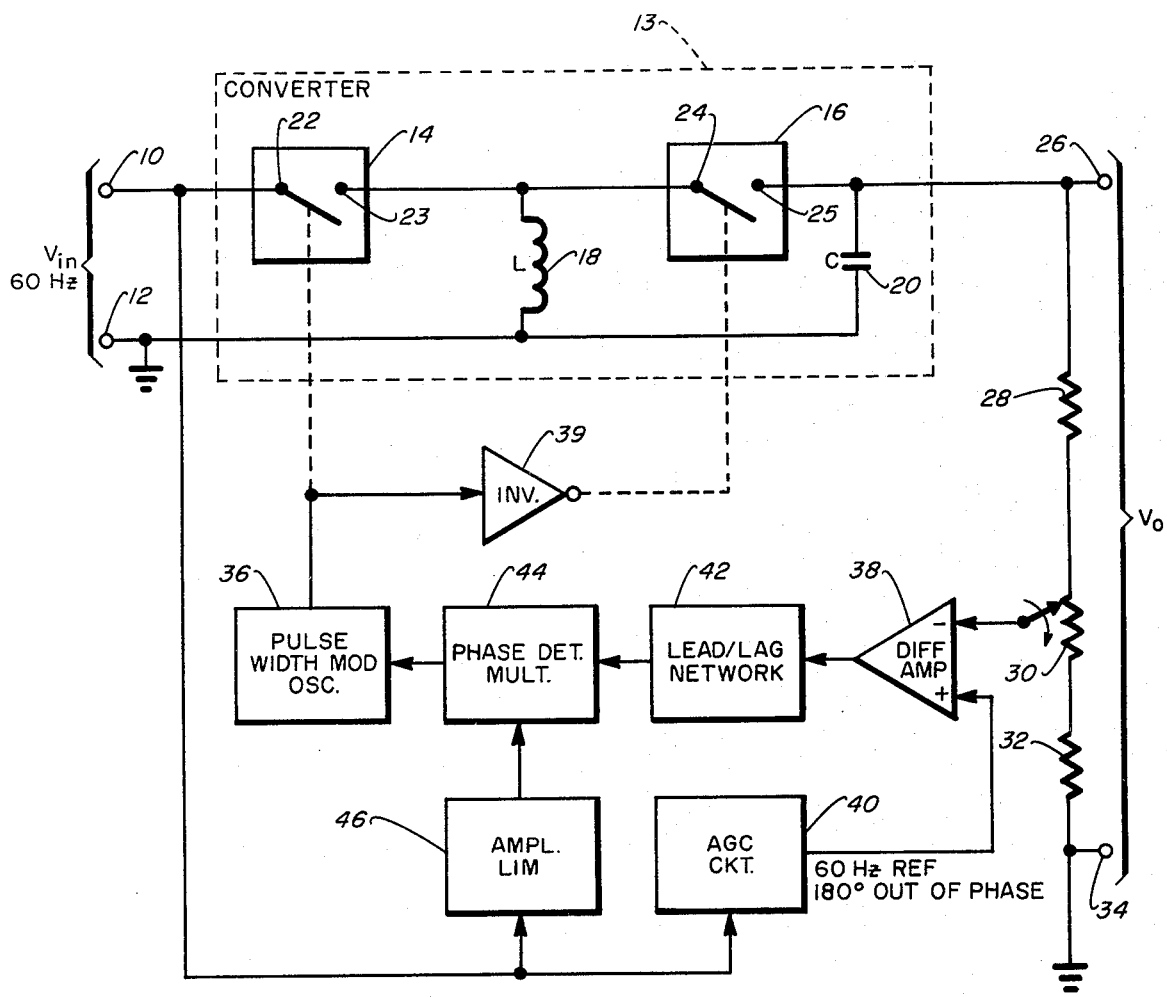
FIG. 1 is a block diagram of a step up/step down solid state transformer according to the present invention.

Referring to the drawing and, more particularly to FIG. 1, which illustrates a step up/step down solid state transformer according to the present invention, an AC signal to be transformed, $V_{in}$, is applied to a pair of input terminals 10 and 12, which receive the signal and return lines, respectively. The AC input signal, $V_{in}$, which may, for example, be a high-power, 60 Hz input signal, is fed to a combination chopper switching means and a low pass filter 13 consisting of a pair of bidirectional solid state switches 14 and 16, an inductor 18 and a capacitor 20 connected in what is commonly referred to in DC to DC switching regulator systems as a buck-boost converter arrangement. The signal input terminal 10 is coupled to the first terminal 22 of the first bidirectional switch 14. The second terminal 23 of the first bidirectional switch 14 is coupled to the first terminal 24 of the second bidirectional switch 16 and through the inductor 18 to the signal return line. The second terminal 25 of the second bidirectional switch 16 is coupled to one system output terminal 26 and through the capacitor 20 to the signal return line. The second terminal 25 of the second bidirectional switch 16 is also coupled via a voltage divider circuit including a first resistor 28, a potentiometer 30, and a second resistor 32 to the signal return line and to the second system output terminal 34.

The control inputs of the first and second bidirectional switches 14 and 16 are coupled to the output of a pulse-width-modulated oscillator 36 which has a frequency very much larger than the frequency of the AC input signal. The control input of the second bidirectional switch is coupled to the oscillator output via an inverter 39 so that the first and second switches 14 and 16 have opposite switching states and are alternately switched on and off by the oscillator output.

Figure 6:
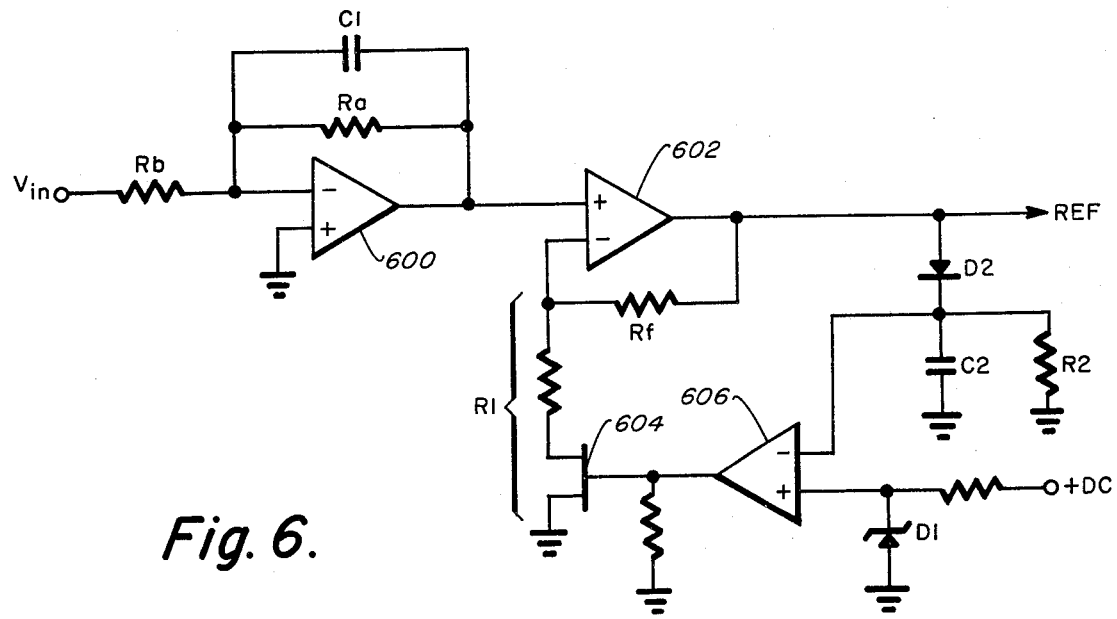
FIG. 6 is a schematic diagram of an automatic gain control circuit suitable for providing the constant amplitude reference required by the present invention.

The duty cycle of the pulse-width-modulated oscillator 36 is controlled by a feedback signal which is derived from the system output voltage, $V_o$. The signal side of the system output is fed via the resistor 28 and the wiper arm of the potentiometer 30 to the negative input of a differential amplifier 38. The positive input of the differential amplifier 38 is coupled to the output of an automatic gain control (AGC) circuit 40 which provides a constant amplitude reference signal that is 180 degrees out of phase with the AC input signal, $V_{in}$. A suitable AGC circuit 40 for deriving the required reference from the AC input signal, $V_{in}$, is shown in FIG. 6 and discussed hereinafter.

The output of the differential amplifier 38 is fed to a lead/lag network 42 which provides compensation for undesirable phase shift around the feedback loop to stabilize the system. The output of the lead/lag network 42 is coupled to one input of a phase detection multiplier 44 which has its other input coupled to an amplitude limiter 46 which has its input coupled to the signal side of the AC input signal. The output of the phase detection multiplier is coupled to the pulse-width-modulated oscillator 36 to adjust the duty cycle of the oscillator.

Figure 2A:
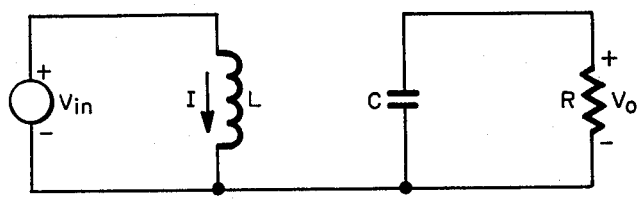
FIGS. 2a and 2b are schematic drawings illustrating the buck-boost converter during the two converter switching states.
Figure 2B:
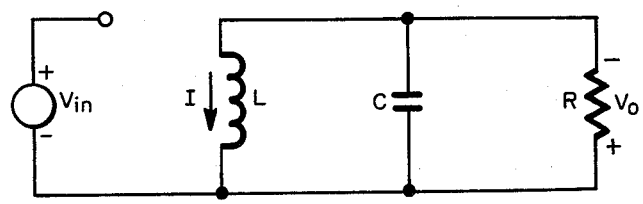

The operation of the solid state transformer of FIG. 1 will now be described for the case where the system input is a 60 Hz signal. Considering first the operation of the buck-boost converter 13, FIG. 2a shows the converter during the interval when the first bidirectional switch 14 is on and the second bidirectional switch 16 is off and FIG. 2b shows the converter during the interval when the first bidirectional switch is off and the second bidirectional switch is on. Defining the duty cycle of the converter as the fraction of the converter switching period during which the first switch 14 is on and the second switch 16 is off, FIG. 2a is the model for the converter during the interval DT and FIG. 2b is the model during the interval $(1-D)T$, where D is the duty cycle and T is the converter switching period. The state equations during the interval DT are given by $$SLI = V_{in},$$

and $$SCV_o = -V_o/R, \qquad (2)$$

while the state equation during the interval $(1-D)T$ are given by $$SLI = V_o,$$

and $$SCV_o = -V_o/R - I. \qquad (4)$$

Averaging these equations over one switching period T, provides state averaged equations for the converter $$SLI = DV_{in} + (1-D)V_o,$$

and $$SCV_o = -V_o/R - (1-D)I. \qquad (6)$$

Eliminating I from equations (5) and (6) gives $$V_o = -\frac{D}{1-D} V_{in} \cdot \frac{1}{1 + \frac{LS}{(1-D)^2 R} + \frac{LCS^2}{(1-D)^2}} \qquad (7)$$

It is apparent from equation (7) that the buck-boost converter is capable of either stepping up or stepping down the input voltage $V_{in}$ depending on the value of the duty cycle, D.

The bidirectional switches 14 and 16 of the converter under control of the pulse-width-modulated oscillator effectively inpart a high frequency component (at the frequency of oscillator 36) to the 60 Hz AC signal. The low pass filter of the converter must provide a high degree of attenuation to this high frequency component while providing no significant attenuation or phase shift to the 60 Hz signal. For illustration, consider the case where $V_{in}$ is a 60 Hz, 120 VRMS signal and the frequency of the oscillator 36 is very much larger, say 40–50 KHz. Choosing the filter components as L=25 $\mu$h and C=100 $\mu$f, consider the followint two extremes of operation.

First, consider the case where the desired output is 240 VRMS (a 2 to 1 step up) at a minimum load resistance of R=48 ohm. This requires a nominal duty cycle of $\frac{2}{3}$. Thus equation (7) becomes $$\frac{V_o}{V_{in}} = \frac{-2}{1 + 0.469 \times 10^{-4}S + 2.25 \times 10^{-8}S^2}$$

Next consider the case where the desired output is 12 VRMS (a 10 to 1 step down) at a load resistance of R=1 ohm. This requires a duty cycle of 1/11. Thus equation (7) becomes $$\frac{V_o}{V_{in}} = \frac{-0.1}{1 + 3.025 \times 10^{-4}S + .3025 \times 10^{-8}S^2}$$

It is apparent that the filter requirements are fulfilled for both of these extreme cases.

The output voltage of the buck-boost converter is compared to the reference from the AGC circuit 40 in the differential amplifier 38 and the difference is then phase compensated in the lead/lag network 42. Since the output of the buck-boost converter is 180 degrees out of phase with its input (see equation 7), the reference is required to also be 180 degrees out of phase with the input AC signal, $V_{in}$.

Ideally the lead/lag network should reduce the net phase shift, other than the 180 degree phase shift inherent in the buck-boost converter, around the feedback loop to zero. The phase compensation is necessary to prevent the feedback from becoming positive during a significant portion of the 60 Hz input cycle. The phase detection multiplier 44 converts the phase compensated output to an error signal which is used to modulate the oscillator pulse width.

If the inputs to the differential amplifier are not equal in amplitude and in phase, the error signal produced will modulate the duty cycle of the oscillator and therefore the duty cycle of the converter to adjust the system output $V_o$ so that the error signal from the differential amplifier is driven toward zero. The gain of the solid state transformer is controlled by the setting of the potentiometer (attenuator) which determines the proportion of the output signal $V_o$ applied feedback to the differential amplifier 38. With a constant amplitude reference supplied from AGC circuit 40, a change in the attenuation of the output signal $V_o$ fed back to the differential amplifier 38 will produce an error signal at the amplifier output. This error signal will alter the duty cycle of the oscillator to change the output signal voltage $V_o$ in order to drive the error signal to zero. An increase in the ratio of the feedback voltage to the output voltage will cause a decrease in the duty cycle which will lower the output voltage and vice versa. It will be recognized that the attenuating potentiometer may be alternatively included in the AGC reference circuit to adjust the gain of the reference fed to the differential amplifier. However, it is preferred that the output voltage adjustment be in the feedback circuit to the differential amplifier 38 rather than the reference circuit. This is because the change in attenuator gain will then be opposite to the change in converter gain. This will minimize the system open-loop gain variation to reduce stability problems.

Figure 3:
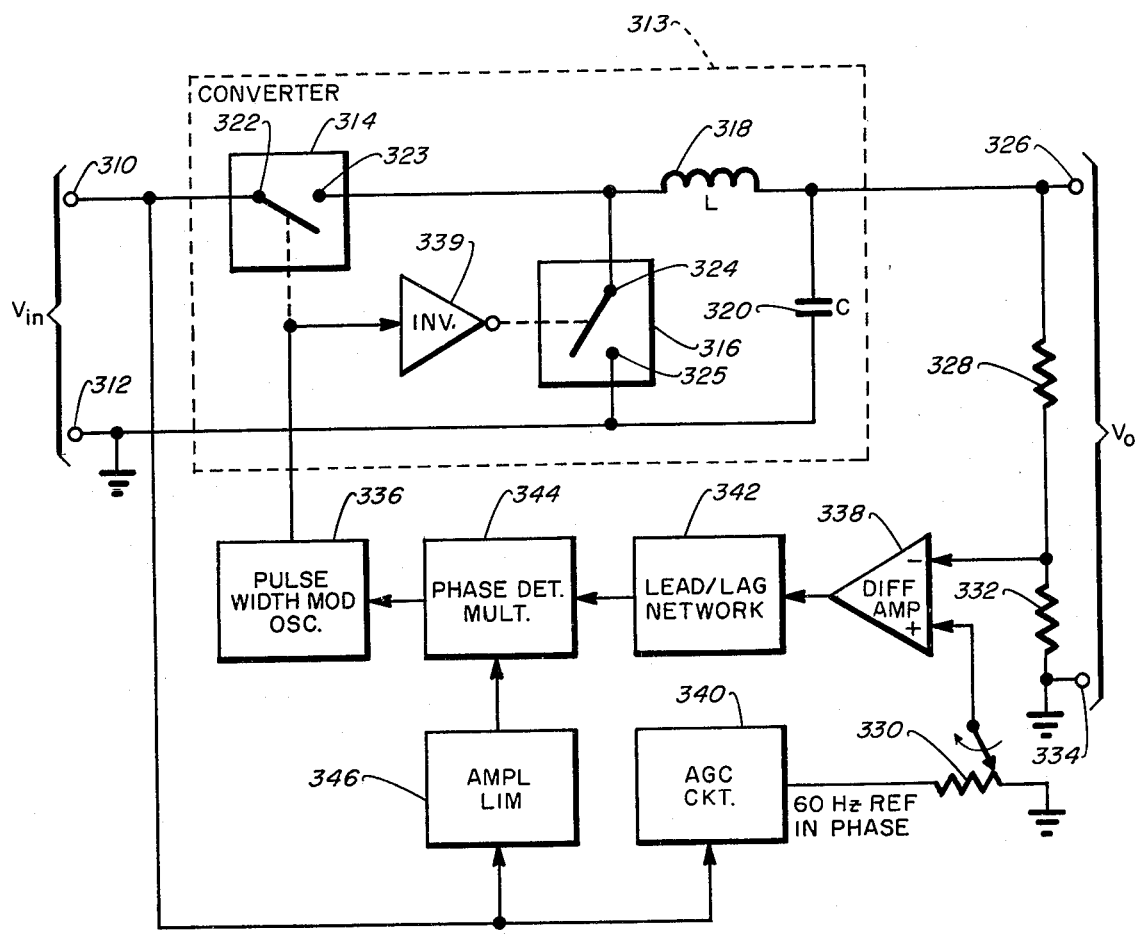
FIG. 3 is a block diagram of a step down solid state transformer according to the present invention.

Referring now to FIG. 3, there is shown an embodiment of a step down solid state transformer according to the present invention. In the step down embodiment, the AC input signal is fed to a combination chopper switching means and low pass filter 313 consisting of a pair of bidirectional solid state switches 314 and 316, an inductor 318 and a capacitor 320 connected in what is referred to in DC to DC switching regulator systems as a buck converter arrangement. The signal input terminal 310 is coupled to the first terminal 322 of the first bidirectional switch 314. The second terminal 323 of the first switch 314 is coupled to the first terminal 324 of the second bidirectional switch 316 and to the low pass filter formed by the inductor 318 and the capacitor 320. The other terminal 325 of the second switch 316 is coupled to the signal return line. The control inputs to the bidirectional solid state switches 314 and 316 are coupled to the output of a pulse-width-modulated oscillator 336 with the control input of the second switch 316 being coupled to the modulator output via an inverter 339 so that the switches have opposite switching states and are alternately switched on and off by the modulator output. Thus the input to the low pass filter is alternately coupled to the first bidirectional switch 314 and the second bidirectional switch 316.

The remainder of the system is the same as in the step up/step down embodiment of FIG. 1 except that the reference supplied to the positive input of the differential amplifier 338 from the AGC circuit 340 is inphase with input AC signal $V_{in}$. In addition, it is preferable that the potentiometer 330 for adjusting the transformer gain be placed in the output of the AGC circuit 340 as shown in FIG. 3 rather than in feedback circuit to the differential amplifier as in the embodiment of FIG. 1.

In operation, the input AC signal (for example, a 60 Hz signal) is chopped by the bidirectional switches 314 and 316 which are alternately switched on and off by the pulse-width-modulated oscillator 336, which is driven at a frequency very much greater than the frequency of the input signal such as 40–50 KHz. The chopper frequency is removed from the 60 Hz signal by the low pass filter formed by inductor 318 and capacitor 320. The output of the low pass filter is equal to the instantaneous average value of the chopped input which is equal to the instantaneous value of the AC input signal, $V_{in}$, times the instantaneous value of the chopper duty cycle. Thus the output voltage, $V_o$, is related to the input voltage, $V_{in}$, and the duty cycle D (the fraction of the chopper period during which switch 314 is on and switch 316 is off) by $$V_o = DV_{in}$$

The output of the filter, $V_o$, is compared to the 60 Hz reference signal which is adjustable via potentiometer 330 input to the differential amplifier 338. The difference between these two is amplified and then phase compensated in lead/lag network 342. Ideally, network 342 should reduce the net phase shift around the feedback loop to zero in the useful frequency range of the system.

The phase detection multiplier 334 converts the phase compensated output to an error signal which is used to modulate the oscillator pulse width. The error signal increases or decreases the duty cycle of the oscillator 336 which changes the time averaged chopper output by increasing or decreasing the closure time of switch 314 relative to switch 316. This in turn increases or decreases the amplitude of the output from the low pass filter. If the net phase shift around the loop is zero, the feedback will cause the output voltage $V_o$ to increase or decrease in order to drive the error signal from the differential amplifier to zero.

Figure 4:
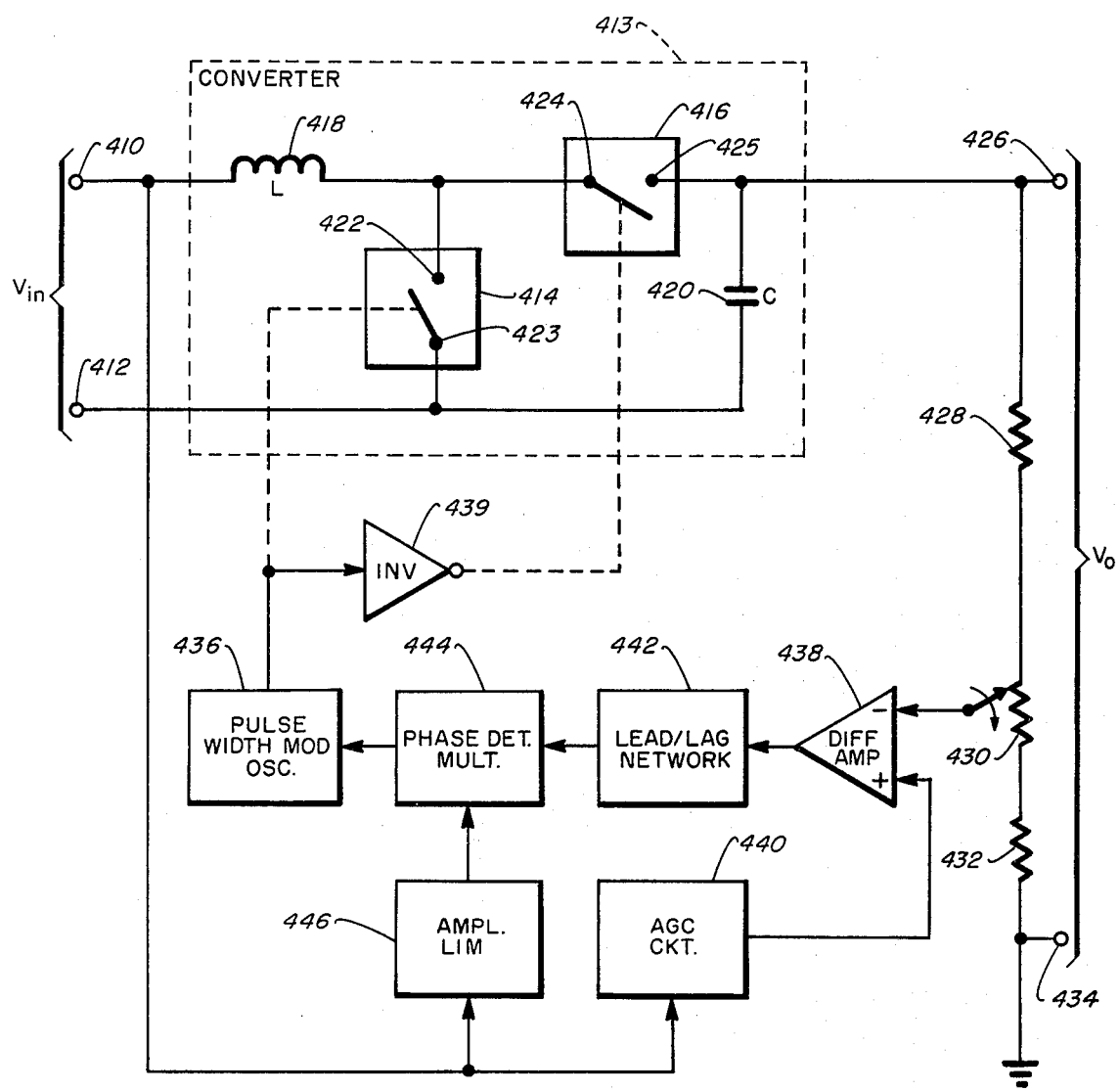
FIG. 4 is a block diagram of a step up solid state transformer according to the present invention.

FIG. 4 illustrates an embodiment of a step up solid state transformer according to the present invention. The step up embodiment is identical to the step up/step down embodiment of FIG. 1, except that the buck-boost converter is replaced by a chopper switching means and low pass filter 413 consisting of a pair of bidirectional solid state switches 414 and 416, an inductor 418 and a capacitor 420 connected in what is referred to in DC to DC switching regulator systems as a boost converter arrangement. In the boost converter arrangement, the signal input terminal 410 is connected through the inductor 418 to one terminal 422 and 424 of both the first and second bidirectional switches 414 and 416, respectively. The other terminal 423 of the first switch 414 is coupled to the signal return line while the other terminal 425 of the second switch 416 is coupled through the capacitor 420 to the signal return line.

Except for the operation of the boost converter, the step up embodiment of FIG. 4 operates in the same manner as the step up/step down embodiment of FIG. 1 to control the duty of the converter and thus select the gain of the transformer. However, the output voltage $V_o$ of the boost converter is related to the input voltage $V_{in}$, and the duty cycle D (the fraction of the chopper period during which switch 414 is on and switch 416 is off) by $$V_o = -V_{in}/1-D.$$

It is apparent from the relationship that the converter is capable of stepping up the input AC voltage depending on the value of the duty cycle as determined by the feedback voltage and the amplitude of the reference voltage.

The bidirectional chopper switches are the most critical components for satisfactory operation of the solid state transformer. This is because high voltage stresses are applied during switching and the fact that the switching speeds must be small compared to the switching period to keep the switching losses small. Table 1 gives the power ratings for the first and second bidirectional switches for a 120 V, 1.2 KVA input signal.

TABLE 1

| Power Switch Ratings, 120 V, 1.2 KVA System | | | |
|---|---|---|---|
| Rating | 0.1 to 2 step up/down | 1.0 to 0.1 step down | 1 to 2 step up |
| Breakdown Voltage | 510 V min. | 170 V min. | 340 V min |
| Current | 35a max. | 35a max. | 10a max. |
| Switching Speed | 1 μsec. max. | 1 μsec. max. | 1 μsec. max. |
| On Resistance | .01Ω max. | .01Ω max. | .25Ω max. |

Figure 5:
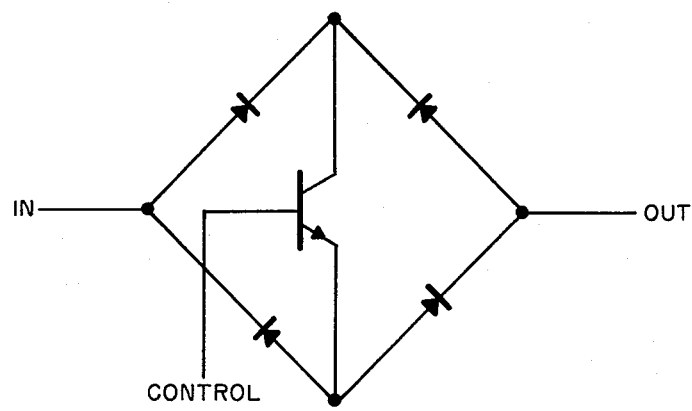
FIG. 5 is a schematic drawing of a bipolar junction transistor suitable for use as a bidirectional chopper switch.

One possible switch configuration for achieving the combination of high breakdown voltage, high current and high speed switching is the bipolar junction transistor switch shown in FIG. 5.

Referring now to FIG. 6, there is shown an AGC circuit suitable for providing a constant amplitude reference which is 180 degrees out of phase with the input AC signal and is relatively insensitive to slow variations in the input amplitude as required by the embodiments of FIGS. 1 and 4.

The circuit employs an AGC scheme which is commonly used to stabilize the output amplitude in RE oscillators.

The operation of this AGC circuit is as follows. The AC input is inverted and attenuated by operational amplifier 600. High frequency noise on the input is removed by capacitor C1. The transfer function of operational amplifier 600 is, $$A_1 = -\frac{R_a}{R_b(1 + R_a C_1 S)}$$

The output of operational amplifier 600 is applied to the input of operational amplifier 602 which has a gain, $$A_2 = 1 + R_f/R_l$$

Where $R_l$ includes the drain to source resistance of the JFET 604.

The output of the operational amplifier 602 is sensed by a peak detector (consisting of diode D2, resistor R2 and capacitor C2) and the detector output is compared in operational amplifier 606 to a DC reference provided by zener diode D1. The difference is an error signal which is amplified and used to change the resistance of the JFET 604 and the operational amplifier 602 gain in such a way that the error signal is driven to zero. In this manner, the peak value of the operational amplifier output is forced to follow the DC reference. Because of the forward drop across diode D2, the peak output voltage will be above the DC reference voltage by the amount of this voltage drop.

It should be noted that for the step down transformer of FIG. 3, the reference must be in phase with the input. If the operational amplifier 600 is replaced by a simple voltage divider, the circuit of FIG. 6 will provide the required in phase reference.

The step up/step down embodiment of FIG. 1 has been the subject of a computer simulation in which the lead/lag network 42 was given a transfer function of $$F(S) = \frac{(1 + 10^{-5}S)^2}{(1 + 10^{-7}S)^2}.$$

The simulation indicated satisfactory system performance for transformer gains of 0.1 to 2 with both leading and lagging power factors of 0.8.

Obviously many modifications and variations of the present invention are possible in the light of the above teachings. It is therefore to be understood that within the scope of the appended claims the invention may be practiced otherwise than as specifically described.

What is claimed is:

1. A solid state regulating power transformer which provides variable step up or step down voltage transformation and which provides a regulated AC output signal from an unregulated AC input signal comprising:
   a. means for chopping said AC input signal at a chopper frequency to provide a chopped signal, said means for chopping being controllable for adjusting the duty cycle of said means for chopping;
   b. filter means for removing the chopper frequency from said chopped signal to provide a filtered signal, said filtered signal being said regulated AC output signal;
   c. means for providing a reference signal at the frequency of said AC input signal;
   d. means for providing a feedback signal derived from the filtered signal;
   e. means for adjusting the gain of the transformer by providing one of means for varying the amplitude of said reference signal and means for varying the amplitude of said feedback signal;

f. means for comparing the amplitude of the reference signal with the amplitude of the feedback signal derived from the filtered signal to produce an error signal related to the difference therebetween, said error signal being coupled to said means for chopping to adjust the duty cycle of said means for chopping wherein the amplitude of said AC output signal is adjusted so that the error signal is driven toward zero and the AC output signal is regulated;

g. said means for comparing including:
   differential amplifier means having a first input coupled to receive said feedback signal, a second input coupled to receive said reference signal, and an output, said differential amplifier means providing a signal related to the difference between its two inputs at its output; and
   pulse-width-modulated oscillator means coupled to receive the output of said differential amplifier means for adjusting the duty cycle of said pulse-width-modulated oscillator means, the output of said pulse-width-modulated oscillator means being coupled to said means for chopping to adjust the duty cycle of said means for chopping;

h. said means for chopping and said filter means including:
   a first bidirectional switching means having a first terminal and a second terminal, the signal side of said AC input signal being coupled to the first terminal of said first bidirectional switching means;
   an inductor means coupled between the second terminal of said first bidirectional switching means and the return side of said AC input signal;
   a second bidirectional switching means having a first terminal and a second terminal, the first terminal of said second bidirectional switching means being coupled to the second terminal of said first bidirectional switching means, and
   a capacitor means coupled between the second terminal of said second bidirectional switching means and the return side of said AC input signal.

2. Apparatus as recited in claim 1 wherein said chopper frequency is very much greater than the frequency of the AC input signal and said filter means attenuates said chopper frequency while passing the frequency of said AC input signal.

3. A solid state regulating power transformer which provides variable step up or step down voltage transformation and which provides a regulated AC output signal from an unregulated AC input signal comprising:

a. means for chopping said AC input signal at a chopper frequency to provide a chopped signal, said means for chopping being controllable for adjusting the duty cycle of said means for chopping;

b. filter means for removing the chopper frequency from said chopped signal to provide a filtered signal, said filtered signal being said regulated AC output signal;

c. means for providing a reference signal at the frequency of said AC input signal;

d. means for providing a feedback signal derived from the filtered signal;

e. means for adjusting the gain of the transformer by providing one of means for varying the amplitude of said reference signal and means for varying the amplitude of said feedback signal;

f. means for comparing the amplitude of the reference signal with the amplitude of the feedback signal derived from the filtered signal to produce an error signal related to the difference therebetween, said error signal being coupled to said means for chopping to adjust the duty cycle of said means for chopping wherein the amplitude of said AC output signal is adjusted so that the error signal is driven toward zero and the AC output signal is regulated;

g. said means for comparing including:
   differential amplifier means having a first input coupled to receive said feedback signal, a second input coupled to receive said reference signal, and an output, said differential amplifier means providing a signal related to the difference between its two inputs at its output; and
   pulse-width-modulated oscillator means coupled to receive the output of said differential amplifier means for adjusting the duty cycle of said pulse-width-modulated oscillator means, the output of said pulse-width-modulated oscillator means being coupled to said means for chopping to adjust the duty cycle of said means for chopping;

h. said means for providing a reference signal including automatic gain control means for providing a reference signal having a stable peak amplitude from the AC input signal.

4. Apparatus as recited in claim 1 including:

a. phase compensation means coupled to the output of said differential amplifier means for adjusting the phase of the output signal from said differential amplifier means;

b. phase detection multiplier means having a first input coupled to the output of said phase compensation means, a second input coupled to the AC input signal, and an output, said phase detection multiplier providing an output signal related to the difference between its two input signals, the output of said phase detection multiplier means being coupled to said pulse-width-modulated oscillator means to control the duty cycle thereof.

5. Apparatus as recited in claim 3 wherein said means for chopping includes:

a. first bidirectional switching means having a first terminal coupled to one side of said AC input signal; and a second terminal; and b. second bidirectional switching means having a first terminal coupled to the second terminal of said first bidirectional switching means, and a second terminal coupled to the other side of said AC input signal;

c. the output of said pulse-width-modulated oscillator means being coupled to said first and second switching means so that said first and second switching means have opposite switching states and the switching states are alternated according to the duty cycle of said pulse-width-modulated oscillator means.

6. Apparatus as recited in claim 5 wherein said filter means includes a low pass filter coupled to the second terminal of said first switching means.

7. Apparatus as recited in claim 3 wherein said means for chopping and said filter means include:

a. first bidirectional switching means having a first terminal and a second terminal, the second terminal coupled to the return side of the AC input signal;

b. inductor means coupled between the signal side of the AC input signal and the first terminal of said first bidirectional switching means;

c. second bidirectional switching means having a first terminal and a second terminal, the first terminal of said second bidirectional switching means being coupled to the first terminal of said first switching means; and d. capacitor means coupled between the second terminal of said second bidirectional switching means and the return side of said AC input signal.

8. Apparatus as recited in claim 3 or 4 wherein said means for varying the amplitude of said reference signal includes a potentiometer for providing variable attenuation of said reference signal.

9. Apparatus as recited in claim 3 or 4 wherein said means for varying the amplitude of said feedback signal includes a potentiometer for providing variable attenuation of said feedback signal.

* * * * *